May 31, 1949.  W. F. FROST  2,471,422
POSITION AND SPEED CONTROL SYSTEM
Filed July 9, 1943  2 Sheets-Sheet 1

INVENTOR
WILLIAM F. FROST
BY Herbert H. Thompson
his ATTORNEY

May 31, 1949.       W. F. FROST       2,471,422
POSITION AND SPEED CONTROL SYSTEM
Filed July 9, 1943                2 Sheets-Sheet 2
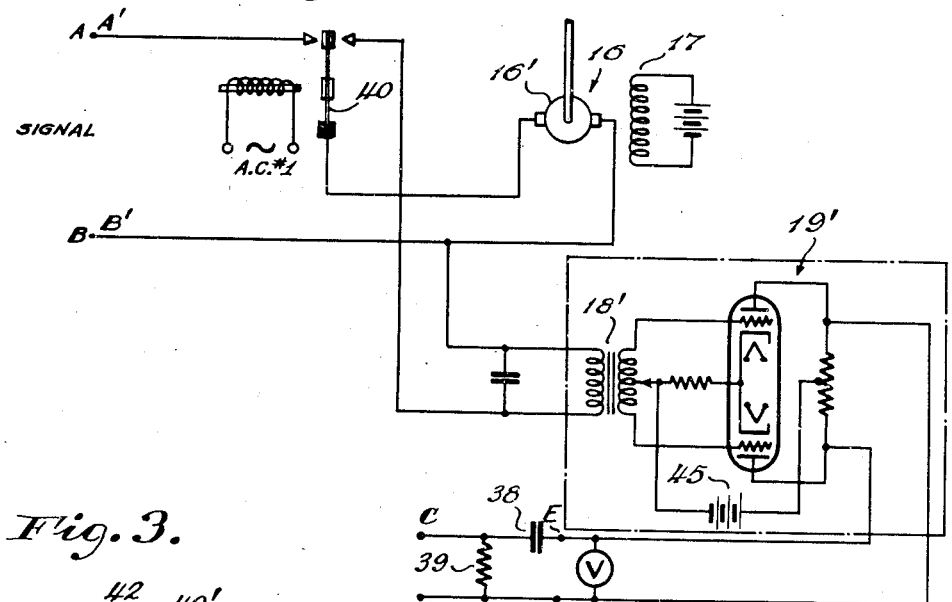
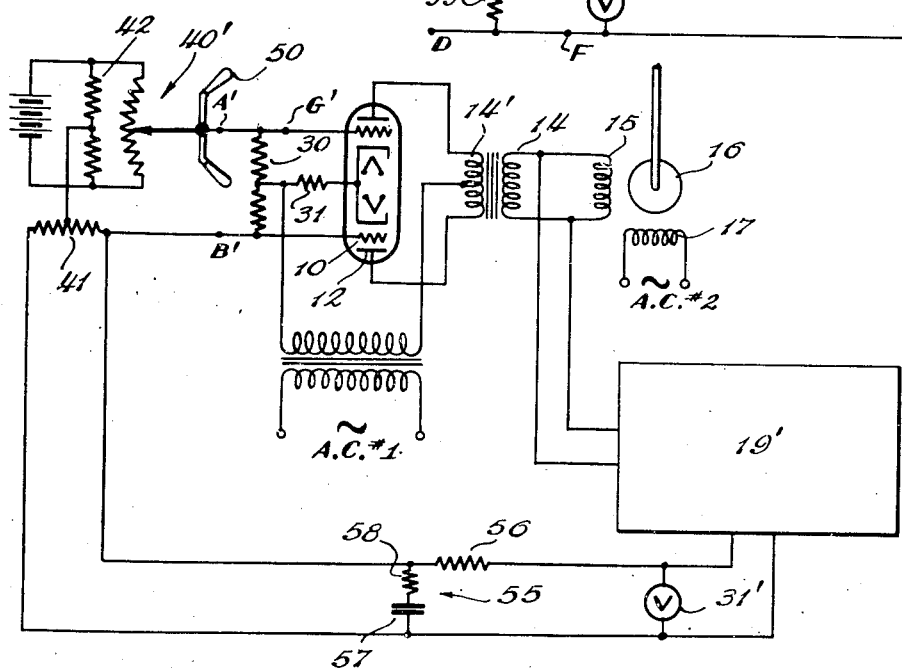
INVENTOR
WILLIAM F. FROST
BY
Herbert H. Thompson
his ATTORNEY ns May 31, 1949

UNITED STATES PATENT OFFICE 2,471,422

POSITION AND SPEED CONTROL SYSTEM

William F. Frost, Williston Park, N. Y., assignor to The Sperry Corporation, a corporation of Delaware Application July 9, 1943, Serial No. 494,010

11 Claims. (Cl. 318—30)

In remotely controlled positional control systems it is frequently desired to introduce a term which is a function of the speed of the driven object, such as a signal directly proportional either to the speed or to the rate of change of such speed, or both, or higher time derivatives of the speed. In order to obtain such a term, it is usual to employ a separate generator driven by the driven object for generating a voltage proportional to the speed of the driven object. It has also been proposed to eliminate such extra generator by obtaining such factor from the counter E. M. F. produced by the motor, as by obtaining the voltage across the brushes of the driving motor, as shown in the prior patent to Francis L. Moseley, No. 2,287,002, dated June 16, 1942, or in the prior application, now the patent of R. H. Nisbet, No. 2,414,430, for Positional control systems, dated January 14, 1947.

The improvement effected by my invention relates to obtaining such signal voltage from the driving motor in a much more accurate and superior manner to that used in the systems referred to above. By my invention I avoid the errors produced in prior systems by variations in the load.

While my system is especially applicable to a two-phase induction motor, it is also applicable to other type motors, as will be readily apparent, and it also has general application to variable speed motors, the speed of which may be precisely controlled through a wide range.

Referring to the drawings,

Fig. 2 is a wiring diagram showing how my invention may be readily applied to a direct current servo motor, and also showing other simplifications.

Fig. 3 is a diagram of a further modification showing my invention applied to the speed control of a motor, especially adapted for tracking in fire control.

Figure 1:
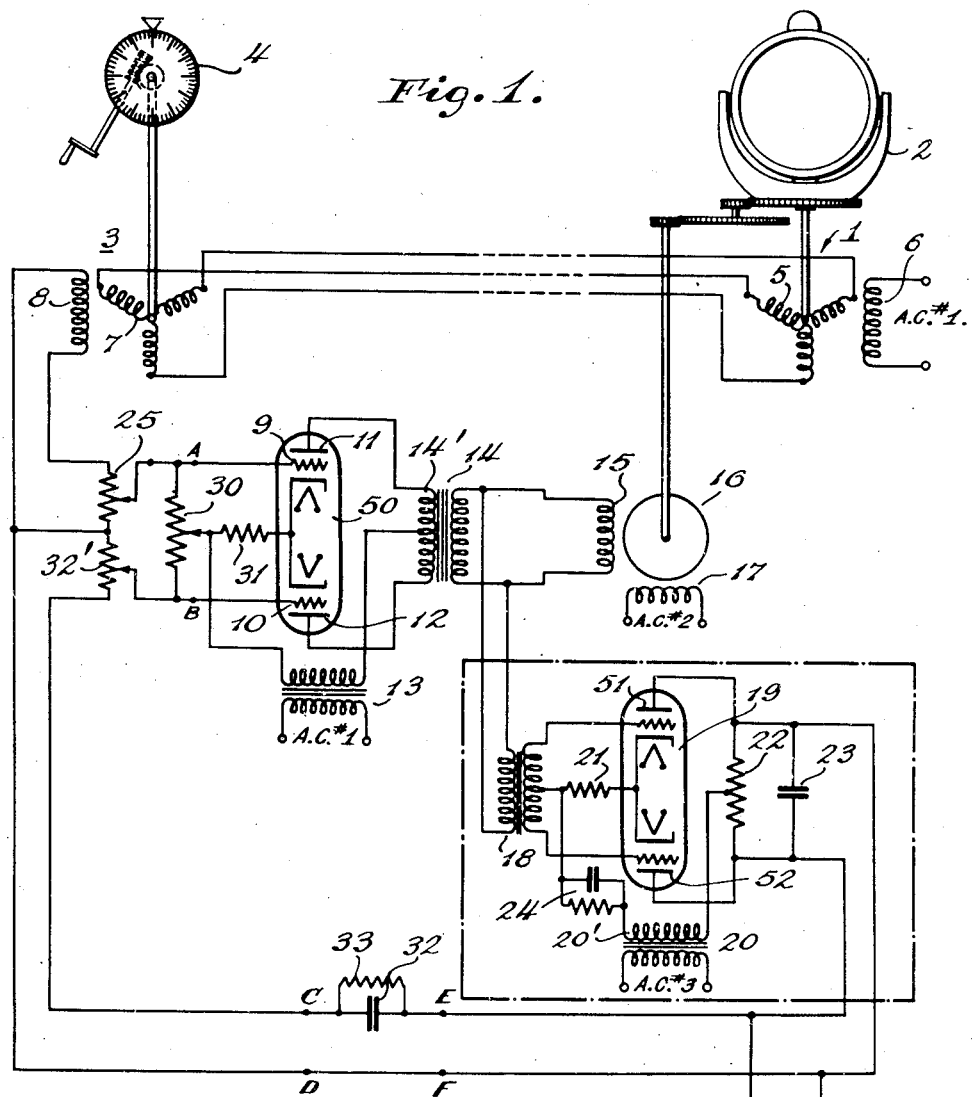
Fig. 1 is a wiring diagram showing my invention as applied to remote positional control of any heavy object through a two-phase induction motor.

Preferably I obtain a primary displacement signal proportional to the positional displacement between the sending and receiving elements, through a self-synchronous transmitter and signal generator, one of which is connected to the sending instrument and one to the receiver, and which produces an alternating current signal proportional in amount to the relative displacement between the two objects of reversible phase (or sign), dependent on whether the displacement is positive or negative. Such systems are well known, and it is obvious that other known systems may be used for the purpose, if desired. I have shown for this purpose a selsyn transmitter or generator 1 turned by the driven object 2, and a selsyn signal generator 3 turned from the setting or angle transmitting device 4. The transmitter is shown as having an armature 5 wound in three-phase manner, and a single-phase field 6 supplied from an alternating current source, marked A. C. #1. The three leads from the armature 5 are connected to the coresponding leads on the armature 7 of the signal generator 3 so that the output of the field 8 thereof (constituting the displacement signal) is governed as to phase and magnitude by the relative displacement of the two armatures 5 and 7. The signal thus obtained is suitably amplified, as by being oppositely connected to the grids 9 and 10 of a balanced modulator 50, shown as comprising a pair of multi-element electronic tubes (or series of such tubes), known in the art as a balanced modulator, which may or may not be enclosed within a single envelope. In other words, as grid 9 is swinging positive, grid 10 swings negative if a signal is present. The plates 11 and 12 of said tubes are supplied with alternating current from a source of alternating current, which is preferably the same phase an frequency as the source which supplies the transmitter 1 and is hence marked A. C. #1. As shown, this supply is connected between the plates and the cathodes through the transformer 13, one end of the secondary of which is connected to the two cathodes, and the other end connected to a center-tap on winding 14' of output transformer 14. The plates 11 and 12 are shown connected to opposite ends of winding 14'. The tubes conduct only during the portion of the cycle in which the plates are positive, so that the plates become positive at the same time and negative at the same time, thus shutting the tubes off and on together. A pulsating current, therefore, under the control of grids 9 and 10, will flow through the plate circuits of the two tubes (including primary winding 14') in opposition to each other, the voltage of each varying with the relative magnitude of the signal on the grids. The voltage generated in the secondary of transformer 14 will be interrupted alternating current and its phase will change sign when the phase generated in field 8, and therefore supplied to the grids, is reversed.

Th secondary of transformer 14 is shown as connected to one field 15 of the two-phase induction motor 16, the other field 17 thereof being supplied from an alternating current source (A. C. #2) which is so phased that the phase of the current through the field 17 is 90° from the phase of the current through the field 15.

It may be demonstrated that when a two-phase motor is mechanically driven at a predetermined speed with one phase only excited, a voltage is produced in the other phase winding proportional to such speed. By my invention, I make use of this phenomenon by measuring the voltage produced in field 15 periodically and at a time when the driving current is zero, so that the disturbing effect of the driving current, which varies with the load, is avoided. In other words, the two-phase motor has periodically applied thereto the driving voltage, and in the intervening intervals means are used for measuring and/or utilizing the ac voltage generated due to the speed of the motor. A convenient means of accomplishing this purpose is to apply power to the field 15 in half cycle (or a little more than half cycle) pulses, the measuring circuit being paralyzed at this time, but activating the measuring circuit during the alternate half cycle, or preferably some fractional portion thereof, so that the measuring circuit responds only to the voltage due to speed.

For this purpose I have shown the primary of a transformer 18 tapped across the leads between 14 and 15, the secondary of the transformer being center-tapped to the cathodes of a second balanced modulator 19 so that opposite voltages are applied to the two grids from the outer ends of the secondary.

The circuit supplying the plate voltage to tubes 19 is such that the plate voltage is positive only for a portion of the cycle in which the driving current is zero. The plates are shown as supplied with alternating current from a transformer 20 supplied from an alternating current power source A. C. #3, which is preferably the same frequency as the other power sources and so phased that the output circuit is approximately 180° from source #1. The secondary of said transformer 20 is shown as connected at one end to the cathodes through a cathode resistor 21, and the other end to the center of an output resistor 22, the outer ends of which are connected to the plates, and around which the load circuit is connected. As in the case of tubes 11 and 12, the output will be in the form of pulsating unidirectional current which may be filtered by means of condenser 23, acting in conjunction with resistor 22.

The output of the circuit so far described would be positive during half of each cycle, but I prefer to render the measuring circuit operative for less than half of each cycle in order to allow for the carry-over effects of transformer 14 and the inductive lag in the armature as the current is interrupted, and also in order to improve the power output of the motor. I therefore prefer to provide a means to shift the mean level of the impulses supplied to the plates so that they will be positive for considerably less than half a cycle. This may be accomplished by shifting the bias on either the grids or the plates in a negative direction as by a battery or rectifier. For this purpose I have shown a filter 24 interposed in the output of the secondary 20' of transformer 20, from which a direct current bias is obtained, reducing the periods that the plates are positive with respect to the cathodes to less than one half cycle.

The output of this network may be fed back to oppose the input signal from winding 8. As shown, the two signals are mixed by being oppositely connected to the center-tap of resistor 25, each branch of which is preferably adjustable to obtain the proper proportion as between the displacement and velocity signal, and the algebraic sum is fed to the grids 9 and 10, as above explained. A voltage dividing input resistor 30 is shown connected across the grid leads, the center tap being connected through cathode resistor 31 to the cathodes.

I may also connect a voltmeter 31', if desired, across the output of the amplifier 19, thereby giving a direct reading of the speed of the motor 16, as D. C. voltages.

It is obvious that I may also either differentiate or integrate said signal for producing a signal representing displacement or acceleration, respectively. A very simple means for obtaining an acceleration term is represented by condenser 32 connected in series with the signal (in combination with resistor 32' across the line) so that only the rate of change of the signal is reflected beyond the condenser. The time constant of condenser 32—resistor 32' should be short. I also prefer to shunt the condenser by a resistor 33 so that the rate signal is carried through as well as the acceleration term.

Figure 1A:
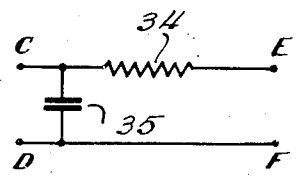
Fig. 1A is a wiring diagram showing how the speed voltage signal output may be integrated, if desired, to obtain a second signal which is a function of the relative displacement, (i. e., lack of positional agreement) of the controlling and controlled instruments.

An integration may be readily obtained as shown in Fig. 1A, in which a resistor (or choke) 34 is connected in series with the signal, in combination with a condenser 35 across the line, or some other suitable form of filter circuit with a long time constant, replacing network 32, 33 between points C, D, E and F.

Fig. 2 shows how my invention may be applied to an ordinary direct current servo motor 16, together with other simplifications. In this instance, a simplified method of obtaining a pulsating current is shown, which comprises some form of half-wave rectifier in series with the alternating current signal. As shown, this comprises a polarized vibrating spring armature 40 designed to vibrate in synchronism with the alternating current signal #1.

When the vibrating switch is to the left, the driving circuit from the signal appearing at points A and B (which are also so marked in Fig. 1) is connected in series with the armature 16' to drive the same. When, however, the switch is to the right, the signal circuit is disconnected and the armature connected to the modulator 19'. Said modulator may be similar to the modulator 19, but since the half-wave rectifying switch 40 comprises a convenient means for de-activating or otherwise disconnecting the modulator during the portions of the cycle at which the driving circuit is connected to the motor, I may simplify the circuit somewhat by supplying the plates 51 and 52 of the tubes with continuous positive potential, as from B battery 45. The tube then will be regulated entirely through the signal on the grids, which are biased to the "off" position when no signal appears across the input transformer 18'. It will be evident that the system will work substantially the same as the system of Fig. 1.

In this system I have also shown a means for wiping out the speed signal after a predetermined interval, so as to eliminate the speed lag error otherwise introduced thereby in the positional control system. A simple means for accomplishing this purpose comprises a condenser 38 in series with the line, across which is connected a high resistance 39, the time constant of the network being long. By this arrangement, while the system is being speeded up, the plates of the condenser are being charged and a speed signal passed back to the input, but as the speed reaches a steady state, the charge on the condenser will gradually reach equilibrium, so that the voltage across resistance 39, and therefore the speed signal, will disappear, and therefore the lag otherwise caused thereby will be eliminated. By some such means I secure a simple speed lag eliminator for positional control systems.

My invention is also not necessarily limited to positional control systems, but may apply to accurate speed control of motors in other types of systems, such as rate control circuits used in fire control and elsewhere. Such a system is illustrated in Fig. 3, in which the modulating networks may be similar to Fig. 1, except that the input signal is preferably but not necessarily direct current and obtained from a potentiometer controller 40' which produces a signal which varies in magnitude and direction with the position of the controller handle 50. In this case the feed-back voltage from the balanced modulator 19 may be mixed with the primary signal by connecting it across the center-tapped resistor 41, which is connected to a second center-tapped resistor 42 in parallel with the potentiometer resistor 40'.

In fire control systems using a mechanical speed control without position or displacement controls, it has been found difficult to track the target accurately since, if lagging, one naturally increases the speed of tracking to be greater than the rate of movement of the target. This naturally causes over-shooting and then, in decreasing the speed to allow the target to catch up, the same trouble will be experienced in reverse. A mechanical system has accordingly been devised, known as "aided tracking," to overcome this in mechanically controlled systems.

I achieve a similar purpose in my electrical speed control, but in a different manner. For this purpose I have shown a special network 55 connected in the output of the modulator 19. By this network I obtain a delay in the follow-back speed signal, which of course tends to temporarily increase the speed of the motor. For this purpose I have shown a resistor 56 connected in series with one lead, and a condenser 57 in series with a second resistor 58 connected across the leads. By adjusting the time constants of this network, a delay is introduced in the answer-back or speed signal which causes a small surge in the speed of the motor following a given adjustment of the potentiometer, which dies away to the proper tracking speed by the time the moving target is caught up with. By this system it is found easier to track a target than with a straight speed arrangement, and it is therefore termed "aided tracking."

Figure 3A:
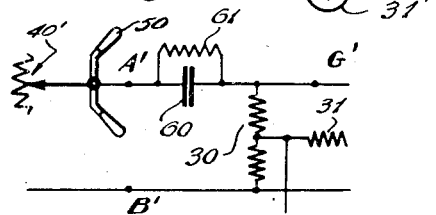
Fig. 3A shows a modification of the speed control system of Fig. 3 for obtaining aiding tracking in a different manner.

Aided tracking can also be obtained in a speed control system by inserting a time derivative network in the input signal in place of the decaying integrating circuit shown in the answer-back speed signal of Fig. 3. Such a scheme I have illustrated in Fig. 3A, in which the network shown may be inserted between the points A' and G', of Fig. 3 in which case the network 55, 56, 57, 58 of Fig. 3 is omitted. The aforesaid differential network may merely comprise a condenser 60 in series with the signal which, operating in connection with resistor 30, will give a time derivative of the signal, or in other words, will give an output which varies with the rate of change of signal. By bridging the condenser 60 with a resistor 61, the signal proportional to the position of the potentiometer arm 40', or in other words, the rate signal is also carried through to the input of the balanced modulator 19'. Therefore, the speed at which the motor is driven will depend not only upon the position of the potentiometer, but also upon the rate of change of position (if any) which will have the effect of increasing the motor speed rapidly when the potentiometer is being moved away from its zero position, and will have the reverse effect as it is being brought back. At the same time the motor speed will ultimately die down to the proper speed indicated by the potentiometer's position just after the potentiometer ceases to move.

Many variations of the above systems within the scope of my invention will be obvious to those skilled in the art. Thus, it is obvious that the original signal supplied to both Figs. 1 and 2 may be direct current instead of alternating current since the feed-back in both cases has a direct current component. This idea is indicated in Fig. 2 by marking the points A, B also A', B', to indicate that these points may be connected to an input similar to the input to the left of points A', B' in Fig. 3 as well as to the inputs to the left of points A and B in Fig. 1. With a direct current signal applied in Fig. 2, the vibrating interrupter switch 40 would supply the armature 16 with direct current impulses quite similar to the impulses supplied when vibrated in phase with an alternating current supply, and the current through the armature would likewise be reversed in case the current supply to points A and B were reverse.

It will also be apparent that my invention may be equally well applied to systems in which a power multiplying means may be used between the improved electric motor of my invention and a final object to be positioned. Thus, it is obvious that my improved motor may be used in place of the motor 44 and generator 65 in the prior joint application of applicant and H. L. Hull and W. S. Gorrill, now Patent No. 2,408,069, dated September 24, 1946, for Gun positioning system, in which the motor is controlled from a displacement signal and acts to position the stroke rod of a Vickers or other variable speed hydraulic servo system, the position of which governs the speed of the servo, while the generator furnishes a counter signal proportional to the motor speed.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a speed control for motors, the combination with an electric motor, means for supplying E. M. F. thereto in periodic pulses of a magnitude and phase variable with the desired speed and direction, an amplifier connected to the winding of the motor in which a counter E. M. F. is generated substantially proportional to its speed, means for rendering said amplifier effective only between said pulse periods, and a feed-back from the output of said amplifier to modify said first means.

2. A speed controlling motor system as claimed in claim 1, in which said motor is of the two-phase induction type having two field windings, one winding being supplied by said pulses and the other winding by an alternating current source of like cycles but phased 90° to said pulses, and in which said amplifier is connected across said first winding.

3. In a positional control system, means for obtaining a pulsating signal proportional in amount to the amount of such displacement of a control element and of a reversible phase governed by the direction of such displacement, a driven object, a servomotor driving the driven object and controlled by said signal, an intermittently activated amplifier connected to a winding of the motor in which the counter E. M. F. is proportional to speed, means for so timing the activating periods of said amplifier that it is operative only during intervals between the pulses of said controlling signal, and means for applying the output of said amplifier to modify said signal input to said motor.

4. In an electrically controlled tracking system including a driving motor and a speed and direction controller for the same, the position of which controls the voltage supplied to the tractor motor as to amount and sign, means for obtaining a feed back voltage proportional in amount and sign to the speed of the tractor, means for combining said feed back voltage in degenerative fashion with the voltage derived from said controller, and means for returning voltage changes in said feed back voltage whereby aided tracking is secured.

5. A positional control system as claimed in claim 3, having means for obtaining a time derivative of the output of said amplifier to secure acceleration as well as a velocity term.

6. In a servomotor control system, a driving motor, a displaceable controller connected in controlling relation to said motor and comprising means for supplying a voltage to control the speed of said motor, the position of said controller determining the magnitude of voltage supplied to said motor, means for obtaining a speed voltage proportional to the speed of said motor, feed back means for combining said speed voltage with and in opposition to the control voltage, and means for delaying for a time interval the feed back of changes in the speed voltage, whereby upon an increase in control voltage due to repositioning said controller the motor speed will exceed that for which the controller is positioned during the time interval of delay in feed back of said speed voltage.

7. A servomotor control system comprising a reversible, variable speed electric motor having a field winding, motor speed control means for supplying current to said motor winding in pulses and in reversible directions therethrough, an amplifier having its input connected to said motor winding and its output connected to reduce the current supplied to said motor, and means for activating said amplifier during intervals only between the current pulses supplied to said motor.

8. A servomotor control system comprising a reversible, variable speed two phase electric motor, one phase of said motor being excited from a single phase source, motor speed control means for supplying current to the second phase of said motor in pulses and in reversible directions, an amplifier having its input connected to the second phase of said motor and its output being connected to reduce the current supplied to said motor, and means for activating said amplifier during intervals only between the current pulses supplied to said motor.

9. In a servomotor system, a motor, a source of control signal voltage, a phase-sensitive amplifier having its input connected to receive said signal voltage and its output connected in controlling relation to said motor, said amplifier operating to supply current to said motor in pulses having a magnitude and polarity sense dependent on the magnitude and polarity sense of the signal voltage, a feed back circuit having its output connected in degenerative fashion to said amplifier, and means for operatively connecting the input of said feed back circuit to said motor during intervals only between pulses supplied to said motor.

10. A servomotor system of the character recited in claim 9 in which the motor is a two phase motor having one phase thereof connected to a single phase source and having its other phase connected both to the output of said amplifier and to the input-connecting means of the feed back circuit.

11. A servomotor system comprising a motor, a source of control signal voltage, a phase-sensitive amplifier having its input connected to receive said signal voltage and its output connected in controlling relation to said motor, said amplifier operating to feed current to said motor in pulses having a magnitude and polarity sense dependent upon the magnitude and polarity sense of said signal voltage, a feed back circuit having its output connected in degenerative fashion to said amplifier and its input connected to receive the back E. M. F. generated by said motor, electron tube means connected in said feed back circuit, and means for rendering said tube means conductive during intervals only between pulses supplied to said motor.

WILLIAM F. FROST.

REFERENCES CITED

The following references are of record in the file of this patent:

UNITED STATES PATENTS

| Number | Name | Date |
|---|---|---|
| 1,703,280 | Minorsky | Feb. 26, 1929 |
| 1,988,458 | Minorsky | Jan. 22, 1935 |
| 2,040,014 | Moseley | May 5, 1936 |
| 2,068,490 | Hull | Jan. 19, 1937 |
| 2,088,654 | Hull | Aug. 3, 1937 |
| 2,105,598 | Hubbard | Jan. 18, 1938 |
| 2,113,436 | Williams | Apr. 5, 1938 |
| 2,115,086 | Riggs | Apr. 26, 1938 |
| 2,131,759 | Satterlee | Oct. 4, 1938 |
| 2,209,369 | Wills | July 30, 1940 |
| 2,263,497 | Harrison | Nov. 18, 1941 |
| 2,287,002 | Moseley | June 16, 1942 |
| 2,325,092 | Andrews | July 27, 1943 |

Patent No. 2,471,422 Certificate of Correction

WILLIAM F. FROST May 31, 1949

It is hereby certified that errors appear in the printed specification of the above numbered patent requiring correction as follows:

Column 1, line 53, for the word "aiding" read *aided*; line 54, for "ina" read *in a*; column 7, line 36, for "returning" read *retarding*;

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*